US008799892B2

United States Patent
Hepkin (10) Patent No.: US 8,799,892 B2
(45) Date of Patent: Aug. 5, 2014

(54) SELECTIVE MEMORY DONATION IN VIRTUAL REAL MEMORY ENVIRONMENT

(75) Inventor: David Alan Hepkin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1368 days.

(21) Appl. No.: 12/135,316

(22) Filed: Jun. 9, 2008

(65) Prior Publication Data

US 2009/0307686 A1    Dec. 10, 2009

(51) Int. Cl.
*G06F 9/455* (2006.01)
*G06F 9/46* (2006.01)

(52) U.S. Cl.
USPC .............................. 718/1; 718/100; 718/105

(58) Field of Classification Search
None
See application file for complete search history.

(56) References Cited

U.S. PATENT DOCUMENTS

| | | | |
|---|---|---|---|
| 5,715,420 A | 2/1998 | Kahle et al. | |
| RE36,462 E | 12/1999 | Chang et al. | |
| 6,067,607 A | 5/2000 | Maegawa et al. | |
| 6,366,994 B1 | 4/2002 | Kalyur | |
| 6,412,015 B1 | 6/2002 | Navare et al. | |
| 6,530,077 B1 | 3/2003 | Marsh | |
| 6,658,522 B1 | 12/2003 | Martin et al. | |
| 6,785,278 B1 | 8/2004 | Calvignac et al. | |
| 7,000,051 B2 | 2/2006 | Armstrong et al. | |
| 7,203,905 B2 | 4/2007 | Brockway et al. | |
| 7,363,456 B2 | 4/2008 | Fleming et al. | |
| 7,370,160 B2 | 5/2008 | Neiger et al. | |
| 7,624,240 B1 | 11/2009 | Colbert et al. | |
| 7,702,843 B1 * | 4/2010 | Chen et al. | 711/6 |
| 7,747,838 B2 | 6/2010 | Hepkin et al. | |
| 7,971,027 B2 | 6/2011 | Fleming et al. | |
| 8,055,876 B2 | 11/2011 | Fleming et al. | |
| 2004/0230974 A1 * | 11/2004 | Hamilton et al. | 718/100 |
| 2005/0232192 A1 * | 10/2005 | Rawson, III | 370/329 |
| 2005/0235123 A1 | 10/2005 | Zimmer et al. | |
| 2005/0235124 A1 * | 10/2005 | Pomaranski et al. | 711/170 |
| 2005/0257020 A1 | 11/2005 | Kashyap et al. | |
| 2005/0268052 A1 * | 12/2005 | Hepkin et al. | 711/159 |

(Continued)

OTHER PUBLICATIONS

U.S. Appl. No. 12/135,012.

(Continued)

Primary Examiner — Emerson Puente
Assistant Examiner — Jonathan R Labud
(74) Attorney, Agent, or Firm — Garg Law Firm, PLLC; Rakesh Garg; David A. Mims, Jr.

(57) ABSTRACT

A method, system, and computer usable program product for selective memory donation in a virtual real memory environment are provided in the illustrative embodiments. A virtual machine receives a request for memory donation. A component of the virtual machine determines whether a portion of a memory space being used for file caching exceeds a threshold. The determining forms a threshold determination, and the portion of the memory space being used for file caching forms a file cache. If the threshold determination is false, the component ignores the request. If the threshold determination is true, a component of the virtual machine releases a part of the file cache that exceeds the threshold. The part of the file cache forms a released file cache. In response to the request, the virtual machine makes the released file cache available to a requester of the request.

20 Claims, 5 Drawing Sheets

(56) References Cited

U.S. PATENT DOCUMENTS

| | | |
|---|---|---|
| 2006/0004977 A1 | 1/2006 | Jann et al. |
| 2006/0288187 A1* | 12/2006 | Burugula et al. ............. 711/171 |
| 2007/0005870 A1 | 1/2007 | Neiger et al. |
| 2007/0106993 A1* | 5/2007 | Largman et al. ............. 718/104 |
| 2007/0294501 A1 | 12/2007 | Wolf et al. |
| 2008/0082696 A1 | 4/2008 | Bestler |
| 2009/0307377 A1 | 12/2009 | Anderson et al. |
| 2009/0307686 A1 | 12/2009 | Hepkin |

OTHER PUBLICATIONS

U.S. Appl. No. 12/135,286.

U.S. Appl. No. 12/135,494.

* cited by examiner

FIG. 1

DATA PROCESSING SYSTEM 100

SELECTIVE MEMORY DONATION IN VIRTUAL REAL MEMORY ENVIRONMENT

BACKGROUND OF THE INVENTION

1. Field of the Invention

The present invention relates generally to an improved data processing system, and in particular, to a computer implemented method for managing memory space. Still more particularly, the present invention relates to a computer implemented method, system, and computer usable program code for selective memory donation in a virtual real memory environment.

2. Description of the Related Art

Data processing systems can be divided into logical partitions (LPAR). A logical partition is also known as a virtual machine. Each virtual machine operates as a separate data processing system independent of the other logical partitions. Generally, a partition management firmware connects the various virtual machines and provides the network connectivity among them. Hypervisor is an example of such partition management firmware.

A data processing system generally includes a fixed amount of physical or real memory. In partitioning the data processing system, the fixed amount of real memory is also partitioned for use by the various virtual machines. Partition management firmware virtualizes the real memory allocated to the virtual machines. Virtualizing real memory is providing a virtual address space that maps to a data storage area larger than the corresponding data storage area of the real memory. When the virtual machine using the virtualized real memory uses more of the virtualized real memory than the real memory allocated to the virtual machine, the partition management firmware pages some of the contents of the real memory out and pages in the content being used by the virtual machine.

Among other uses, virtualizing real memory allows for improved utilization of physical memory on a machine. Virtualizing real memory also allows for hosting a large number of virtual machines on a single data processing system by over-committing the available physical memory. Virtualizing real memory also facilitates the use of advanced workload management capabilities, such as shifting memory between virtual machines that may be busy at different times of the day.

However, virtualized real memory can impose significant performance penalties on the data processing system. For example, to manage virtualized real memory, the partition management firmware generally maintains its own paging spaces for the virtual machines. A paging space is a data storage area allocated to store pages of data removed temporarily from the real memory. Paging space generally exists on data storage devices that are larger in size but slower in speed as compared to the real memory. Such a data storage is also called secondary storage. A hard disk is an example of a secondary storage where paging space may be allocated.

When real memory is over-committed, the hypervisor has to page in and out virtual machines' real memory to and from paging spaces on secondary storage. This paging process is expensive for several reasons. For example, the partition management firmware may not pick the most suitable pages for paging because the partition management firmware may not be aware of a virtual machine's page usage to the extent the operating system executing inside the virtual machine may be.

Additionally, paging using the partition management firmware can often lead to double paging as described by the following example paging scenario. For example, the hypervisor could page out virtual machine memory pages that are being used to cache mundane data, such as file data, in the virtual machine. When the operating system inside the virtual machines needs to flush out cached file pages to make room for comparatively more important data in the virtual machine, the operating system causes the hypervisor to page in the cached file pages, bringing them into memory from the hypervisor paging space. The operating system may then flush the file pages out of memory onto disks containing the file systems. Thus, the partition management firmware will have paged in a page only to page it back out.

To combat these types of problems associated with virtualized real memory, some virtual machine environments use memory donation techniques. Memory donation is also known as ballooning. Memory donation or ballooning involves having a process of the operating system isolate unused or unimportant memory pages and donate it to the partition management firmware. When the physical memory is over-committed, the partition management firmware requests the virtual machines to donate memory to the partition management firmware. An operating system of a virtual machine pages out the unused or unimportant pages to the operating system's own paging space and gives the empty pages to the partition management firmware. Thus, the partition management firmware knows these donated pages are empty and does not have to page any data out of them.

Presently used memory donation techniques have shortcomings as well. Some of the disadvantages of the current memory donation techniques are that current memory donation techniques are resource intensive and result in undesirable structure of the virtual machines for portability. Therefore, an improved system, method, and product for selective memory donation in a virtual real memory environment will be desirable.

SUMMARY OF THE INVENTION

The illustrative embodiments provide a method, system, and computer usable program product for selective memory donation in a virtual real memory environment. A virtual machine receives a request for memory donation. A component of the virtual machine determines whether a portion of a memory space being used for file caching exceeds a threshold. The determining forms a threshold determination, and the portion of the memory space being used for file caching forms a file cache. If the threshold determination is true, a component of the virtual machine releases a part of the file cache that exceeds the threshold. The part of the file cache forms a released file cache. In response to the request, the virtual machine makes the released file cache available to a requester of the request.

The memory space may be a virtualized real memory space. In making the released file cache available, the virtual machine makes available a virtualized real memory address from the virtualized real memory space.

If the threshold determination is false, the component ignores the request. The threshold may be configurable by a user of the virtual machine. The virtual machine may reclaim the released file cache by using a portion of the released file cache in the virtual machine.

In one embodiment, the requester may be a hypervisor. An operating system of the virtual machine may allocate a first paging space of a first size, the first size being substantially smaller than a size of the memory space. The hypervisor may allocate a second paging space of a second size, the second size being substantially equal to the size of the memory space.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The illustrative embodiments described herein provide a method, system, and computer usable program product for selective memory donation in a virtual real memory environment. A virtual real memory environment is a data processing environment where virtual machines execute in a partitioned data processing system utilizing virtualized real memory and a partition management firmware.

By using the illustrative embodiments, a virtual machine may respond to memory donation requests from a partition management firmware such that the overall resource requirement on the data processing system may be reduced. The illustrative embodiments may also help reduce the cost and improve the overall performance of a data processing system executing a virtual machine.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

The illustrative embodiments are described in some instances using particular data processing environments only as an example for the clarity of the description. The illustrative embodiments may be used in conjunction with other comparable or similarly purposed architectures for using virtualized real memory and managing virtual machines.

Figure 1:
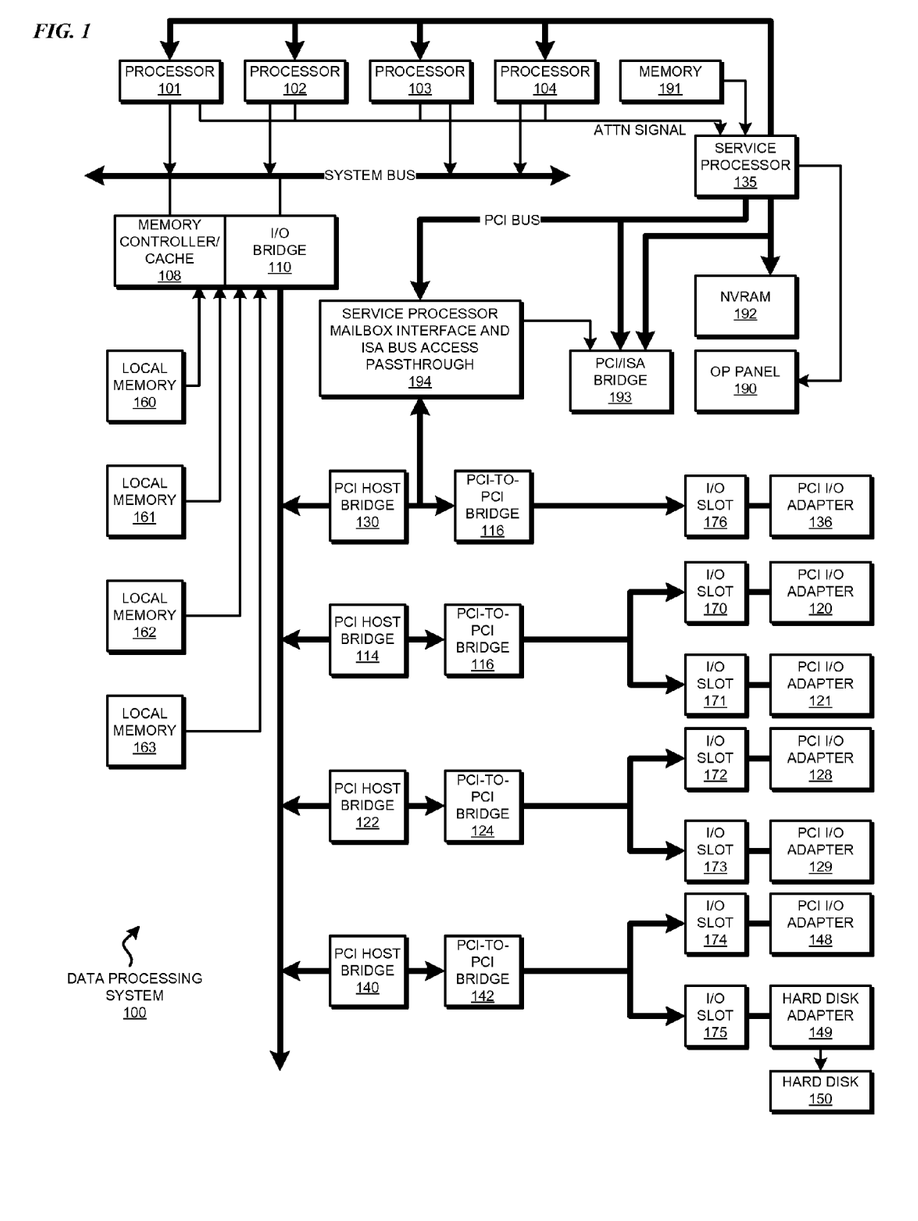
FIG. 1 depicts a block diagram of a data processing system in which the illustrative embodiments may be implemented is depicted.
Figure 2:
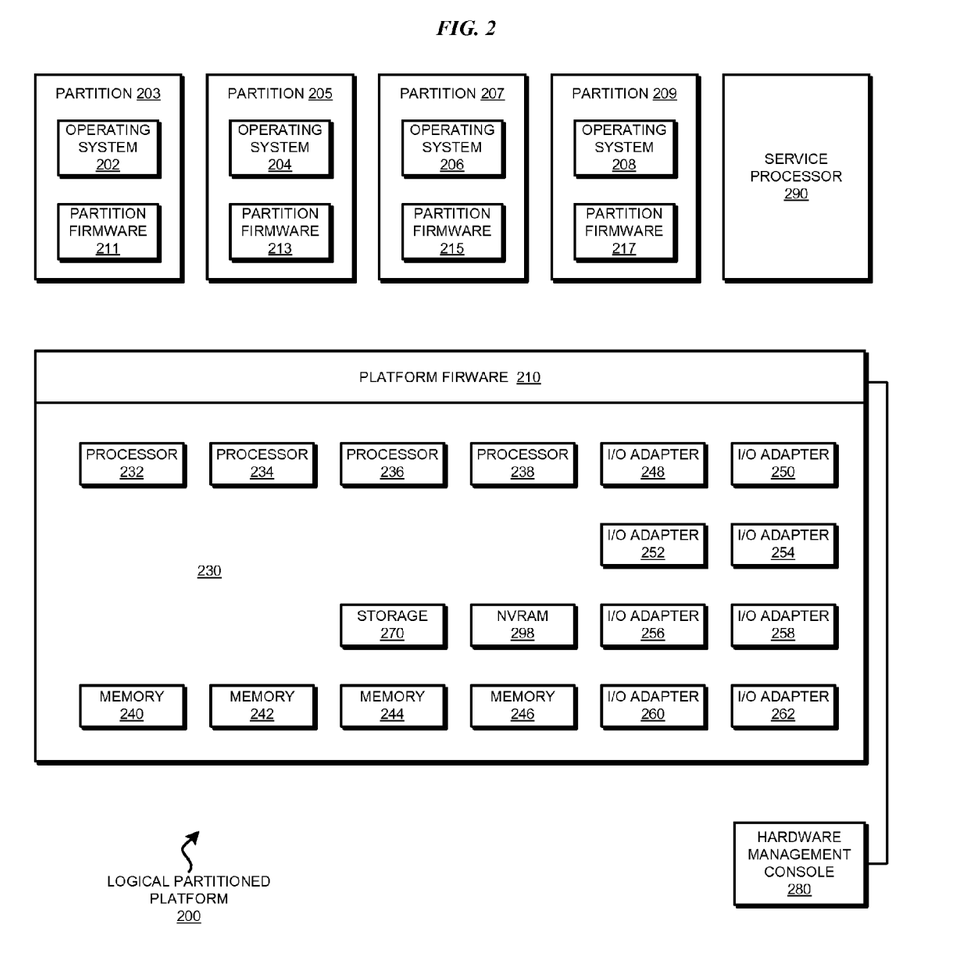
FIG. 2 a block diagram of an exemplary logical partitioned platform is depicted in which the illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

With reference to FIG. 1, this figure depicts a block diagram of a data processing system in which the illustrative embodiments may be implemented is depicted. Data processing system 100 may be a symmetric multiprocessor (SMP) system including a plurality of processors 101, 102, 103, and 104, which connect to system bus 106. For example, data processing system 100 may be an IBM eServer® implemented as a server within a network. (eServer is a product and e(logo)server is a trademark of International Business Machines Corporation in the United States and other countries). Alternatively, a single processor system may be employed. Also connected to system bus 106 is memory controller/cache 108, which provides an interface to a plurality of local memories 160-163. I/O bus bridge 110 connects to system bus 106 and provides an interface to I/O bus 112. Memory controller/cache 108 and I/O bus bridge 110 may be integrated as depicted.

Data processing system 100 is a logical partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 connects for a display device (not shown), while hard disk adapter 149 connects to and controls hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to each of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX®) operating system may be executing within partition P1, a second instance (image) of the AIX operating system may be executing within partition P2, and a Linux® or OS/400® operating system may be operating within logical partition P3. (AIX and OS/400 are trademarks of International business Machines Corporation in the United States and other countries. Linux is a trademark of Linus Torvalds in the United States and other countries).

Peripheral component interconnect (PCI) host bridge 114 connected to I/O bus 112 provides an interface to PCI local bus 115. A number of PCI input/output adapters 120-121 connect to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 connects to a plurality of PCI I/O adapters 128-129. PCI I/O adapters 128-129 connect to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI bus 141.

A PCI host bridge 130 provides an interface for a PCI bus 131 to connect to I/O bus 112. PCI I/O adapter 136 connects to I/O slot 176, which connects to PCI-to-PCI bridge 132 by PCI bus 133. PCI-to-PCI bridge 132 connects to PCI bus 131. This PCI bus also connects PCI host bridge 130 to the service processor mailbox interface and ISA bus access pass-through logic 194 and PCI-to-PCI bridge 132.

Service processor mailbox interface and ISA bus access pass-through logic 194 forwards PCI accesses destined to the PCI/ISA bridge 193. NVRAM storage 192 connects to the ISA bus 196. Service processor 135 connects to service processor mailbox interface and ISA bus access pass-through logic 194 through its local PCI bus 195. Service processor 135 also connects to processors 101-104 via a plurality of JTAG/I2C busses 134. JTAG/I2C busses 134 are a combination of JTAG/scan busses (see IEEE 1149.1) and Phillips I2C busses.

However, alternatively, JTAG/I2C busses 134 may be replaced by only Phillips I2C busses or only JTAG/scan busses. All SP-ATTN signals of the host processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I2C busses 134 to interrogate the system (host) processors 101-104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the illustrative embodiments.

With reference to FIG. 2, a block diagram of an exemplary logical partitioned platform is depicted in which the illustrative embodiments may be implemented. The hardware in logical partitioned platform 200 may be implemented as, for example, data processing system 100 in FIG. 1.

Logical partitioned platform 200 includes partitioned hardware 230, operating systems 202, 204, 206, 208, and platform firmware 210. A platform firmware, such as platform firmware 210, is also known as partition management firmware. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as Hypervisor. OS/400 is used only as an example in these illustrative embodiments. Of course, other types of operating systems, such as AIX and Linux, may be used depending on the particular implementation. Operating systems 202, 204, 206, and 208 are located in partitions 203, 205, 207, and 209.

Hypervisor software is an example of software that may be used to implement partition management firmware 210 and is available from International Business Machines Corporation.

Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes a plurality of processors 232-238, a plurality of system memory units 240-246, a plurality of input/output (I/O) adapters 248-262, and a storage unit 270. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

The hardware in FIGS. 1-2 may vary depending on the implementation. Other internal hardware or peripheral devices, such as flash memory, equivalent non-volatile memory, or optical disk drives and the like, may be used in addition to or in place of certain hardware depicted in FIGS. 1-2. An implementation of the illustrative embodiments may also use alternative architecture for managing partitions without departing from the scope of the illustrative embodiments.

The illustrative embodiments recognize that while memory donation may be better than strictly relying on hypervisor paging, current memory donation techniques may suffer from significant problems. For example, in order for current memory donation technique to work effectively, the operating system inside of each virtual machine must have its own set of paging spaces. Consequently, a partitioned data processing system has to provision two paging spaces for each virtual machine executing thereon—one paging space for use by the operating system and another for use by the partition management firmware.

The illustrative embodiments recognize that this organization of paging space uses approximately twice the amount of paging space actually needed for a virtual machine. For each virtual machine, current memory donation techniques require a paging space that the partition management firmware can use to page out the virtual machine's memory. In addition, a paging space has to be allocated for the operating system of the virtual machine to do its own paging. Thus, for each virtual machine, the current memory donation techniques require allocating disk space equal to at least two times the size of the virtualized real memory allocated to the virtual machine.

As an example, consider a virtual machine with a virtualized real memory size of 10 Giga Bytes (GB). With current memory donation techniques, the user would need to configure LOGB of partition management firmware paging space for the virtual machine as well as LOGB of paging space for use by the operating system of the virtual machine. In other words the user will have to configure 20 GB of secondary storage for LOGB virtualized real memory of the virtual machine.

The illustrative embodiments further recognize that a virtual machine may be encapsulated as a data file. By encapsulating a virtual machine as a file, a user can migrate the virtual machine from one data processing system to another, or copy the virtual machine to other locations and create clones of the virtual machine.

The illustrative embodiments recognize that current memory donation techniques cause the size of the file to inflate, thus making the file and consequently the virtual machine encapsulated therein less portable as compared to a file of a smaller size. The illustrative embodiments recognize that current memory donation techniques slow down operations like duplicating virtual machines and distributing files encapsulating virtual machines.

Additionally, in order for the current memory donation process to perform in a desirable manner, the operating system's paging space generally has to be located on secondary storage devices that are faster than the average disk drive. Otherwise, the operating system's paging could degrade the performance of the virtual machine. This means that fast disk devices are needed for each virtual machine, making some virtual machine configurations cost prohibitive.

Furthermore, where a diskless data processing system is partitioned to execute virtual machines, the size of the paging space according to the current memory donation techniques can make the partitioning impractical. To address these and other problems related to managing virtual real memory environments, the illustrative embodiments provide a method, system, and computer usable program product for selective memory donation in virtual real memory environments.

Figure 3:
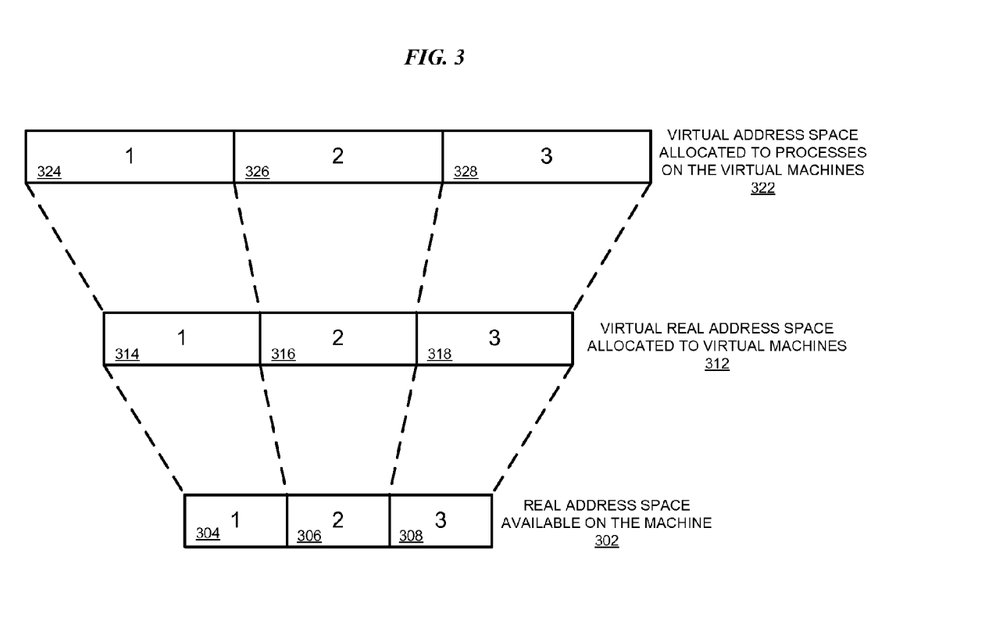
FIG. 3 depicts a block diagram of virtualizing real memory in a data processing system in which the illustrative embodiments may be implemented.

With reference to FIG. 3, this figure depicts a block diagram of virtualizing real memory in a data processing system in which the illustrative embodiments may be implemented. Real address space 302 available on a data processing system may be implemented using any of local memory 160, 161, 162, or 163 in FIG. 1.

Real address space 302 is the amount of real memory available on a data processing system. For the purpose of this figure, assume that three virtual machines are configured on the data processing system and share real address space 302. Virtual machine 1 may be allocated real address space 304, which may be a portion of real address space 302. Similarly, virtual machine 2 may be allocated real address space 306. Likewise, virtual machine 3 may be allocated real address space 308. Real address spaces 304, 306, and 308 together form real address space 302 of the data processing system.

A partition management firmware, such as the hypervisor on the data processing system, may virtualize real address space 302 to virtual real address space 312. The partition management firmware may be implemented using platform firmware 210 in FIG. 2. The hypervisor is used as an example of the partition management firmware in this disclosure only for the clarity of the description and is not limiting on the illustrative embodiments. A similarly purposed alternative firmware or component may be used in place of the hypervisor without departing the scope of the illustrative embodiments.

Virtual real address space 312 may be in turn allocated to the three virtual machines executing on the data processing system. Virtual machine 1 may receive virtual real address space 314, virtual machine 2 may receive virtual real address space 316, and virtual machine 3 may receive virtual real address space 318.

In virtualizing the real address space to the virtual real address space, the hypervisor may enlarge the virtual real address space allocated to each virtual machine as described above. Thus, virtual real address spaces 314, 316, and 318 may be larger than the corresponding real address spaces 304, 306, and 308 respectively as depicted. Virtualized in this manner, each of virtual machines 1, 2, and 3 may operate as if it has real memory of the size of corresponding virtual real address space 314, 316, or 318.

The operating system of virtual machines 1, 2, and 3, may further add a layer of indirection and virtualize the virtual real address space allocated to the virtual machine. For example, the operating system of virtual machine 1 may create virtual address space 324, which may be yet larger than the corresponding virtual real address space 314.

The operating system may then allocate portions of virtual address space 324 to the processes executing on virtual machine 1 as needed. The operating systems of virtual machines 2 and 3 may similarly virtualize their allocated virtual real address spaces. Operating system of virtual machine 2 may allocate memory space to processes from virtual address space 326. Operating system of virtual machine 3 may allocate memory space to processes from virtual address space 328.

Figure 4:
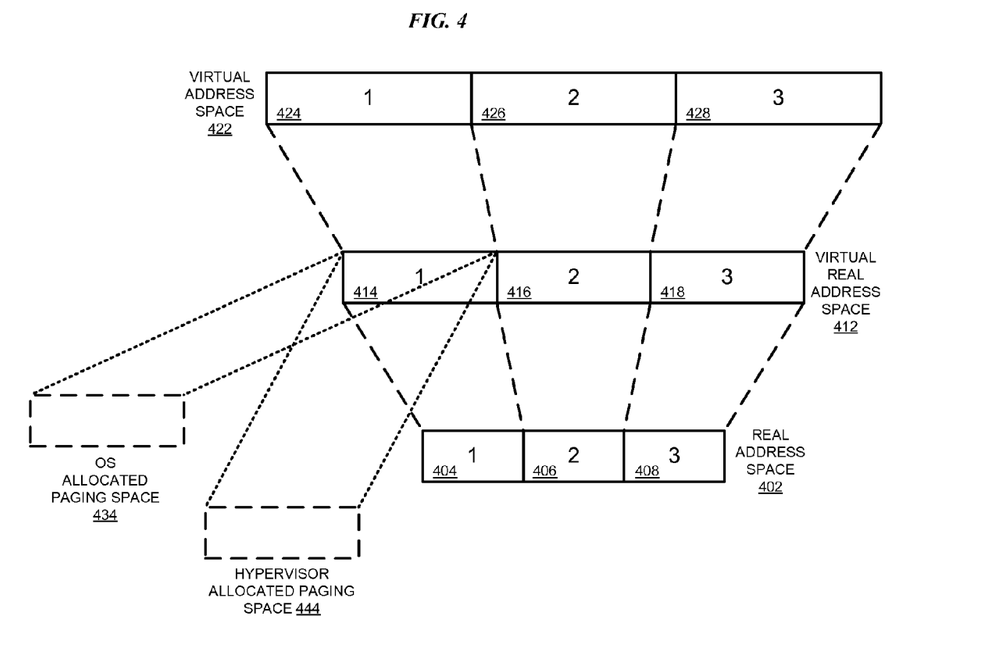
FIG. 4 depicts a block diagram of paging space allocation used in the present memory donation techniques in which an illustrative embodiment may be implemented.

With reference to FIG. 4, this figure depicts a block diagram of paging space allocation used in the present memory donation techniques in which an illustrative embodiment may be implemented. Real address space 402 and portions 404, 406, and 408 correspond to real address space 302 and portions 304, 306, and 308 thereof in FIG. 3.

Virtual real address space 412 and portions 414, 416, and 418 correspond to virtual real address space 312 and portions 314, 316, and 318 thereof in FIG. 3. Virtual address space 422 and portions 424, 426, and 428 correspond to virtual address space 322 and portions 324, 326, and 328 thereof in FIG. 3. Virtual machines 1, 2, and 3 of FIG. 4 correspond to virtual machines 1, 2, and 3 as described with respect to FIG. 3.

The following description uses virtual machine 1 as an example to illustrate the paging space allocation according to current memory donation techniques. The description applies similarly to virtual machines 2 and 3 as well. When the hypervisor or an equivalent component allocates virtual real address space 314 to virtual machine 1, the operating system of virtual machine 1 allocates paging space 434. Paging space 434 accommodates the paging needs of the operating system of virtual machine 1 as relates to executing the processes on virtual machine 1. Paging space 434 is substantially equal in size to the size of virtual real address space 414.

The hypervisor also has to allocate paging space 444 for virtual real address space 414. Paging space 444 is also substantially equal in size to the size of virtual real address space 414. The hypervisor has to allocate paging space 444 in case the operating system of virtual machine 1 misbehaves and does not make pages available in response to memory donation requests.

Figure 5:
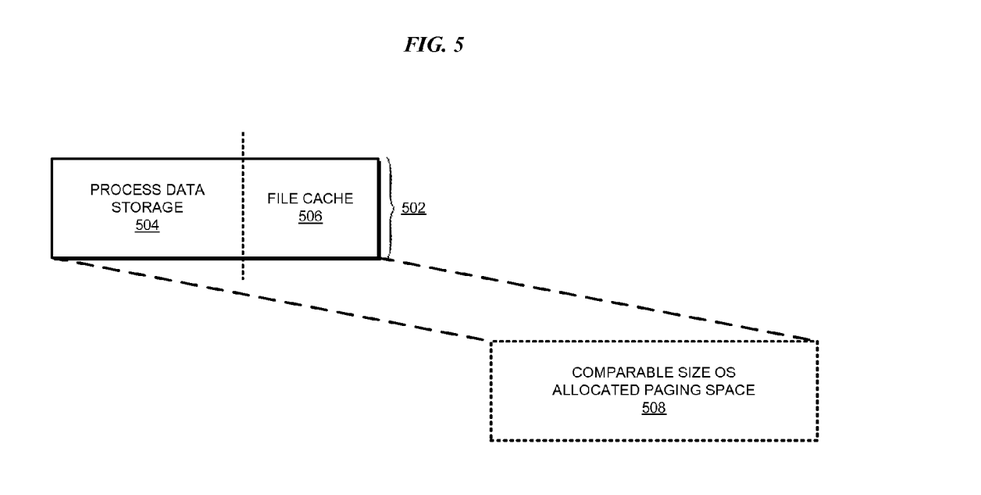
FIG. 5 depicts a block diagram showing a typical usage of memory space in a virtual machine in accordance with an illustrative embodiment.

With reference to FIG. 5, this figure depicts a block diagram showing a typical usage of memory space in a virtual machine in accordance with an illustrative embodiment. Memory space 502 may be a virtual real address space belonging to a virtual machine in a given data processing environment. For example, memory space 502 may be implemented as virtual real address space 414 in FIG. 4.

Typically, an operating system of a virtual machine uses a portion of the available memory space to store data pertaining to the executing processes. This portion is called the process data storage. Process data storage 504 is such a process data storage. Process data storage is also known as process memory, working storage, or other comparable names in various implementations.

Further, the operating system uses another portion of the available memory space for caching files that the executing processes may need. File cache 506 is an example of such a file cache portion of memory space 502. File cache of a memory space, such as file cache 506, stores file data for the executing processes so that the processes may have access to that file data faster compared to if the file data was fetched from a hard disk upon demand.

Currently, the operating system may allocate paging space 508 that may be comparable in size to memory space 502. In other words, the operating system may allocate paging space at the operating system level for process data storage 504. Paging space 508 may be implemented as paging space 434 in FIG. 4.

Illustrative embodiments recognize that paging memory pages from process data storage 504 may adversely affect performance of the virtual machine in a more significant way as compared to paging memory pages from file cache 506. The illustrative embodiments further recognize that presently, the operating system paging space—paging space 508—has to be of a size comparable to the available memory space—memory space 502—because the operating system has to be able to page out as many pages as requested for donation by the hypervisor.

According to the illustrative embodiments, an operating system may be configured to selectively respond to the memory donation requests from the hypervisor. When the operating system in a virtual machine receives a request from the hypervisor for memory donation, the operating system according to the illustrative embodiments honors the request if it can donate pages from the file cache. When the operating system receives the request, the operating system determines if any part of the memory space being used for file cache can be freed for donation to the hypervisor.

Once the operating system's file cache is depleted, the operating system of the virtual machine stops honoring the hypervisor's donation requests. If the hypervisor issues a donation request to the operating system when the operating system's file cache is depleted, the operating system ignores the donation request. The hypervisor may then have to page out some of the virtual machine's real memory. But, because the operating system has already depleted its file cache, now the hypervisor will only be paging out memory pages that contain working storage, i.e., the process data storage pages and not the file cache pages.

Thus, in accordance with an illustrative embodiment, when memory is low on the system, the operating systems in virtual machines target their file cache for memory donation. Reducing the amount of memory being used for the file cache is more efficient as compared to paging out memory from process data storage.

Now, according to the illustrative embodiment, because a virtual machine still rely on the hypervisor to do paging when the file cache is depleted, the paging space for the operating system can be reduced. A system administrator no longer has to maintain for the operating system of the virtual machine a paging space that is comparable to the size of the memory space available to the virtual machine. The system administrator can just configure a large paging space for the virtual machine at the hypervisor level.

Figure 6:
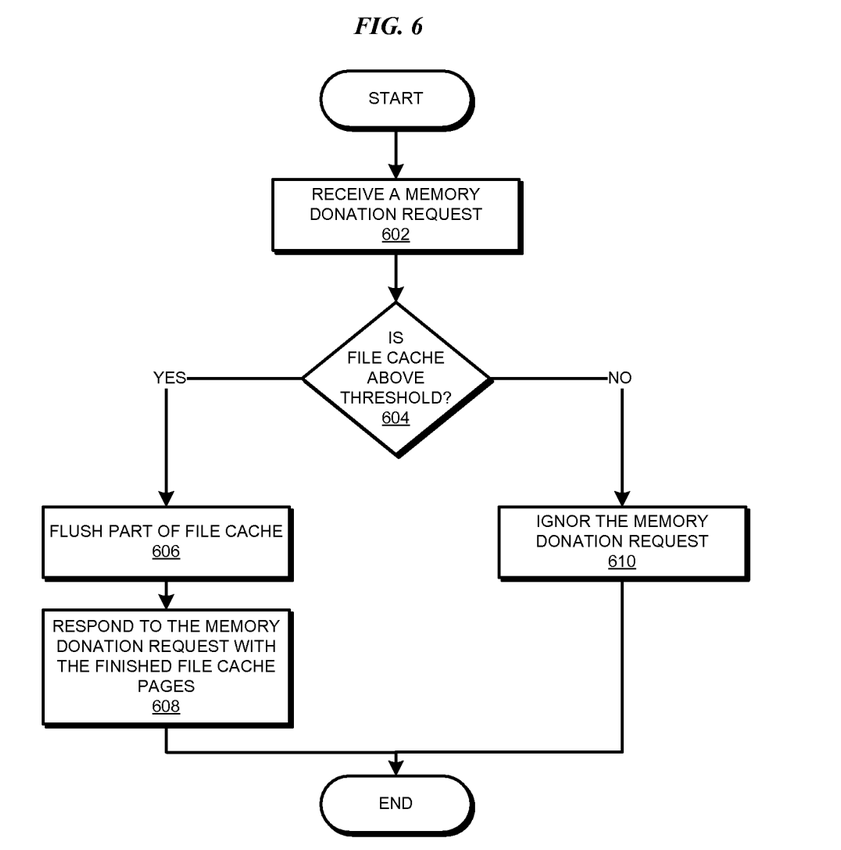
FIG. 6 depicts a flowchart of a process of selectively responding to memory donation requests in accordance with an illustrative embodiment.

With reference to FIG. 6, this figure depicts a flowchart of a process of selectively responding to memory donation requests in accordance with an illustrative embodiment. Process 600 may be implemented in an operating system of a virtual machine, such as operating system 202 in FIG. 2.

Process 600 begins by receiving a memory donation request (step 602). Process 600 determines if the memory usage for file cache is above a threshold usage level (step 604). For example, a system administrator may specify that the operating system should respond to memory donation requests only if the file cache occupies more than 5 percent of the memory space available to the virtual machine. As another example, the system administrator may specify a preset amount of memory space for the file cache, such as 1 GB out of a total of LOGB, exceeding which amount, the operating system may respond to memory donation requests.

If process 600 determines that the file cache is above the threshold ("Yes" path of step 604), process 600 flushes or pages out some pages of file cache from the memory (step 606). Process 600 responds to the memory donation request with the flushed file cache pages (step 608). Process 600 ends thereafter.

If, however, process 600 determines that the file cache is at or below the threshold level ("No" path of step 604), process 600 ignores the memory donation request (step 610). Process 600 ends thereafter as well.

This method of responding to the memory donation requests according to the illustrative embodiments may reduce the disk requirements significantly over traditional virtual machine memory donation/ballooning algorithms. Referring back to the example of a virtual machine with 10 GB of memory space, the user would only need to configure 10 GB of hypervisor paging space for the virtual machine plus a minimal paging space for the operating system as may be necessary for the operation of the virtual machine. For example, the user may be able to keep the virtual machine operational with only 512 MB of paging space at the operating system level in conjunction with the illustrative embodiments. Therefore, rather than using 20 GB of paging space as with current solutions, only 10.5 GB of paging space may be configured in conjunction with the illustrative embodiments.

Figure 7:
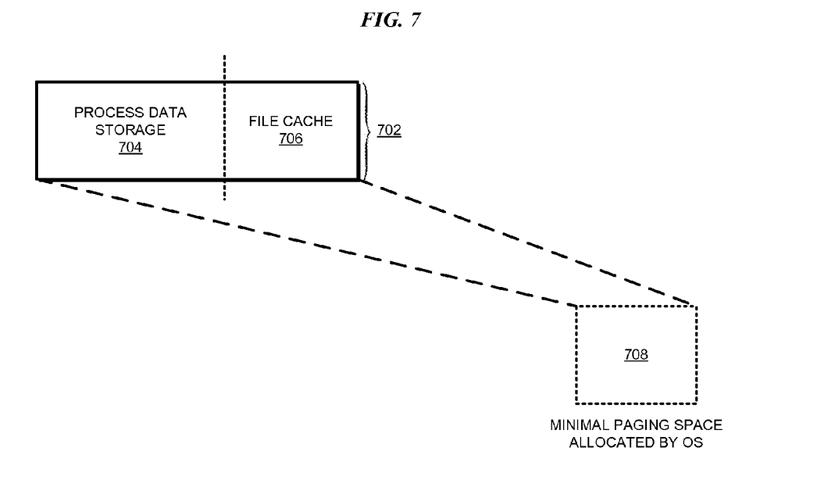
FIG. 7 depicts a block diagram of reduced paging space configurable for the operating system in accordance with an illustrative embodiment.

With reference to FIG. 7, this figure depicts a block diagram of reduced paging space configurable for the operating system in accordance with an illustrative embodiment. Memory space 702 may be a virtual real address space belonging to a virtual machine in a given data processing environment. For example, memory space 702 may be implemented as virtual real address space 414 in FIG. 4.

As described with respect to FIG. 5, an operating system of a virtual machine uses process data storage 704 portion of memory space 702 to store data pertaining to the executing processes. The operating system uses file cache 706 for caching files that the executing processes may need.

According to the illustrative embodiments, the operating system may allocate paging space 708 that may be substantially smaller in size as compared to memory space 702. In other words, the operating system may allocate paging space 708 at the operating system level down to the minimum size recommended for the particular operating system configuration. Paging space 708 may be implemented as paging space 434 in FIG. 4, but may be much smaller than paging space 434 in FIG. 4 for the same virtual real address space 414 in FIG. 4 because of the illustrative embodiments.

The components in the block diagrams and the steps in the flowcharts described above are described only as examples. The components and the steps have been selected for the clarity of the description and are not limiting on the illustrative embodiments. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the illustrative embodiments.

Thus, a computer implemented method, apparatus, and computer program product are provided in the illustrative embodiments for selective memory donation in virtual real memory environments. Using the illustrative embodiments, the file cache portion of the memory belonging to one virtual machine may be donated to the partition management firmware when the memory requirements of the data processing system increase.

In one example implementation, some form of communication is established between the hypervisor and a virtual machine. The hypervisor uses this communication mechanism to communicate memory donation requests to the operating system of the virtual machine. For example, the operating system may make hypervisor calls at some regular interval, such as after every n seconds, and ask the hypervisor if the hypervisor needs the operating system to donate any memory. If the hypervisor responds affirmatively, a donation request from the hypervisor includes the amount of memory the hypervisor needs the operating system to donate.

In another implementation, the hypervisor issues donation requests to the virtual machines executing on the data processing system when physical memory on the data processing system is over-committed. When a virtual machine receives a donation request, the virtual machine's operating system checks to determine if its file cache is above a threshold, for example, more than 3 percent of the memory space available to the virtual machine. If the file cache is above this threshold, the operating system honors the donation request by reducing the size of the file cache and then donating the freed memory to the hypervisor. The operating system reduces the size of the file cache by flushing modified file pages to disk and releasing unmodified file pages. To donate the memory in response to the hypervisor's request, the operating system communicates to the hypervisor the virtualized real memory addresses of the memory that was previously being used to cache file data. These virtualized real memory addresses are also referred to as logical memory addresses.

In either implementations, when the operating system's file cache reaches the threshold limit, the operating system stops honoring donation requests from the hypervisor. In such a case, if the memory already donated by the virtual machines is insufficient to fulfill all of the hypervisor's demands, the hypervisor starts to page out a virtual machine's real memory.

When memory pressure eases, the hypervisor can release donated memory back to the virtual machine by informing the virtual machine that the hypervisor no longer needs the donated memory. The operating system can then reclaim this released memory for caching files or any other use.

If the operating system of a virtual machine experiences an increase in memory pressure while the hypervisor owns the donated memory of the virtual machine, the operating system may reclaim the donated memory. To reclaim memory that was donated, the operating system can simply start using the memory that was previously donated and the hypervisor adapts by paging out another part of the real memory to accommodate the increased use. This process according to the illustrative embodiments allows the operating system of a virtual machine to adapt to changes in workload even after donating memory to the hypervisor.

The illustrative embodiments reduce the overall size of paging space a user has to configure for a virtual machine. Because the operating system of the virtual machine no longer needs a large paging space, the file size of the file encapsulating the virtual machine employing the illustrative embodiments is also smaller as compared to file size with current memory donation techniques. Thus, virtual machines deployment models may be able to deploy these smaller files much faster in comparison with the present solutions in order to duplicate and distribute virtual machines.

Furthermore, a user may only have to configure fast secondary storage devices for the hypervisor paging space. This flexibility due to the illustrative embodiments makes data processing system configuration easier and less expensive as the user does not have to dedicate large amounts of fast resources to the virtual machines.

The invention can take the form of an entirely hardware embodiment, an entirely software embodiment, or an embodiment containing both hardware and software elements. In a preferred embodiment, the invention is implemented in software, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for selective memory donation, the computer implemented method comprising:
   receiving, in a virtual machine, a request for memory donation;
   selectively determining with an available option to ignore the request, in the virtual machine, whether a size of a portion of a memory space being used for file caching exceeds a threshold size, forming a threshold determination, the portion of the memory space being used for file caching forming a file cache;
   releasing, responsive to the threshold determination being true, a part of the file cache that exceeds the threshold size, the part forming a released file cache; and
   making available, responsive to the request, the released file cache to a requestor of the request by making a set of virtualized real memory addresses corresponding to the released file cache accessible to the requestor, wherein the set of virtualized real memory addresses remains accessible to the virtual machine to reclaim at least a portion of the released file cache.

2. The computer implemented method of claim 1, further comprising:
   ignoring the request, responsive to the threshold determination being false, wherein the requestor is a partition management firmware outside the virtual machine.

3. The computer implemented method of claim 1, wherein the memory space is a virtualized real memory space, and wherein making available the released file cache is making available a virtualized real memory address from the virtualized real memory space.

4. The computer implemented method of claim 1, wherein the threshold is configurable by a user of the virtual machine.

5. The computer implemented method of claim 1, further comprising:
reclaiming the released file cache by using a portion of the released file cache in the virtual machine.

6. The computer implemented method of claim 1, wherein the requestor is a hypervisor.

7. The computer implemented method of claim 6, wherein an operating system of the virtual machine allocates a first paging space of a first size, the first size being substantially smaller than a size of the memory space, and wherein the hypervisor allocates a second paging space of a second size, the second size being substantially equal to the size of the memory space.

8. A computer usable program product comprising a computer usable hardware storage device including computer usable code for selective memory donation, the computer usable code comprising
computer usable code for receiving, in a virtual machine, a request for memory donation;
computer usable code for selectively determining with an available option to ignore the request, in the virtual machine, whether a size of a portion of a memory space being used for file caching exceeds a threshold size, forming a threshold determination, the portion of the memory space being used for file caching forming a file cache;
computer usable code for releasing, responsive to the threshold determination being true, a part of the file cache that exceeds the threshold size, the part forming a released file cache; and
computer usable code for making available, responsive to the request, the released file cache to a requestor of the request by making a set of virtualized real memory addresses corresponding to the released file cache accessible to the requestor, wherein the set of virtualized real memory addresses remains accessible to the virtual machine to reclaim at least a portion of the released file cache.

9. The computer usable program product of claim 8, further comprising:
computer usable code for ignoring the request, responsive to the threshold determination being false, wherein the requestor is a partition management firmware outside the virtual machine.

10. The computer usable program product of claim 8, wherein the memory space is a virtualized real memory space, and wherein the computer usable code for making available the released file cache includes computer usable code for making available a virtualized real memory address from the virtualized real memory space.

11. The computer usable program product of claim 8, comprising computer usable code for configuring the threshold, by a user of the virtual machine.

12. The computer usable program product of claim 8, further comprising:
computer usable code for reclaiming the released file cache by using a portion of the released file cache in the virtual machine.

13. The computer usable program product of claim 8, wherein the requestor is a hypervisor.

14. The computer usable program product of claim 13, wherein an operating system of the virtual machine executes computer usable code for allocating a first paging space of a first size, the first size being substantially smaller than a size of the memory space, and wherein the hypervisor executes computer usable code for allocating a second paging space of a second size, the second size being substantially equal to the size of the memory space.

15. A data processing system for selective memory donation, the data processing system comprising:
a storage device including a storage medium, wherein the storage device stores computer usable program code; and
a processor, wherein the processor executes the computer usable program code, and wherein the computer usable program code comprises:
computer usable code for receiving, in a virtual machine, a request for memory donation;
computer usable code for selectively determining with an available option to ignore the request, in the virtual machine, whether a size of a portion of a memory space being used for file caching exceeds a threshold size, forming a threshold determination, the portion of the memory space being used for file caching forming a file cache;
computer usable code for releasing, responsive to the threshold determination being true, a part of the file cache that exceeds the threshold size, the part forming a released file cache; and
computer usable code for making available, responsive to the request, the released file cache to a requestor of the request by making a set of virtualized real memory addresses corresponding to the released file cache accessible to the requestor, wherein the set of virtualized real memory addresses remains accessible to the virtual machine to reclaim at least a portion of the released file cache.

16. The data processing system of claim 15, further comprising:
computer usable code for ignoring the request, responsive to the threshold determination being false, wherein the requestor is a partition management firmware outside the virtual machine.

17. The data processing system of claim 15, wherein the memory space is a virtualized real memory space, and wherein the computer usable code for making available the released file cache includes computer usable code for making available a virtualized real memory address from the virtualized real memory space.

18. The data processing system of claim 15, comprising computer usable code for configuring the threshold, by a user of the virtual machine.

19. The data processing system of claim 15, further comprising:
computer usable code for reclaiming the released file cache by using a portion of the released file cache in the virtual machine.

20. The data processing system of claim 15, wherein the requestor is a hypervisor, and wherein an operating system of the virtual machine executes computer usable code for allocating a first paging space of a first size, the first size being substantially smaller than a size of the memory space, and wherein the hypervisor executes computer usable code for allocating a second paging space of a second size, the second size being substantially equal to the size of the memory space.

* * * * *